UNITED STATES PATENT OFFICE.

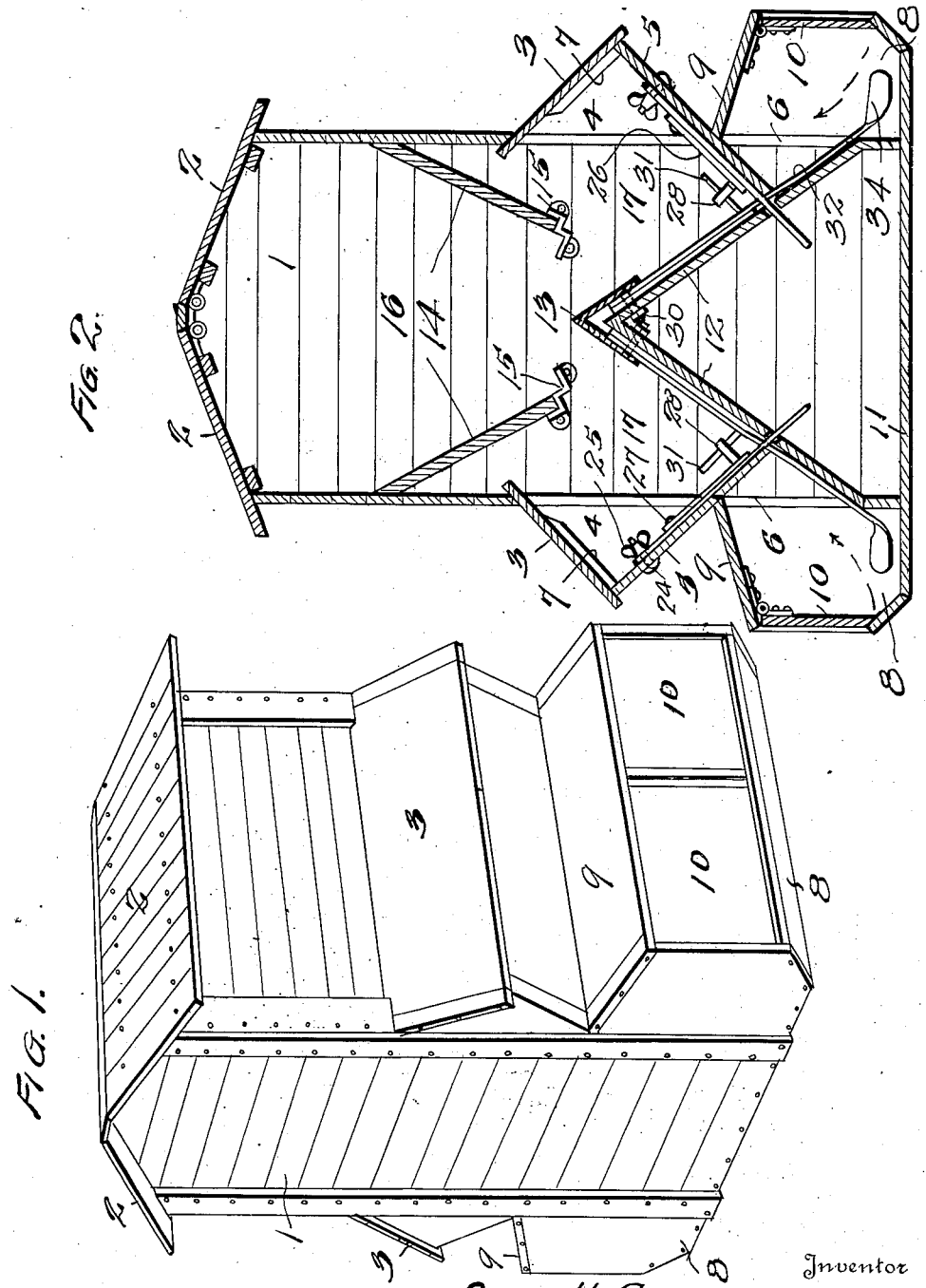
O. H. CLOUGH.
ANIMAL FEEDING DEVICE.
APPLICATION FILED JAN. 22, 1916.
1,175,124.
Patented Mar. 14, 1916.
3 SHEETS—SHEET 1.
Inventor
OTIS H. CLOUGH
By Herman A. Phillips
Attorney
Witness
C. K. Davis

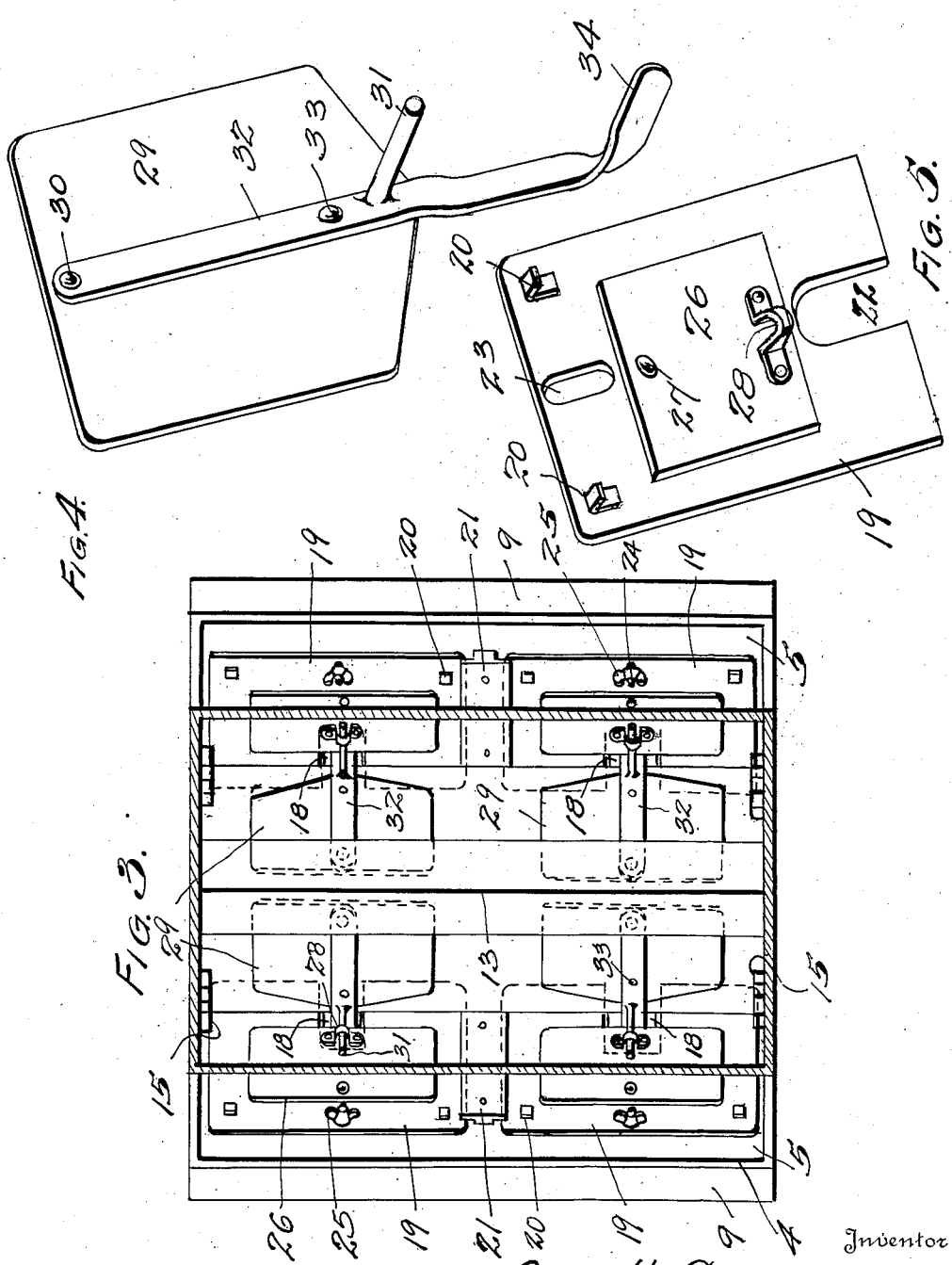

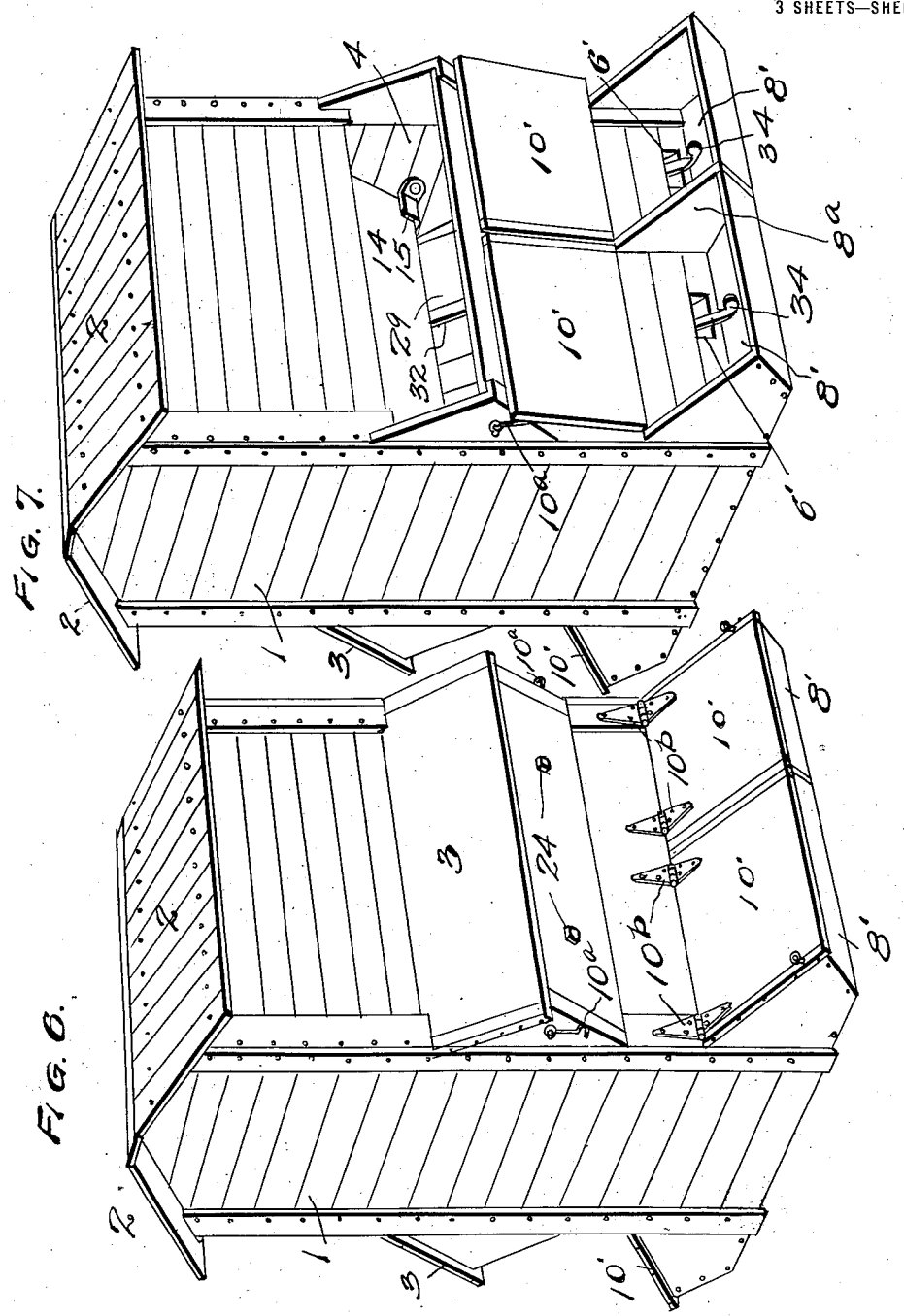

OTIS HALE CLOUGH, OF MECHANICSBURG, OHIO.

ANIMAL-FEEDING DEVICE.

1,175,124. Specification of Letters Patent. Patented Mar. 14, 1916.

Application filed January 22, 1916. Serial No. 73,638.

*To all whom it may concern:*

Be it known that I, OTIS H. CLOUGH, a citizen of the United States of America, residing at Mechanicsburg, in the county of Champaign and State of Ohio, have invented new and useful Improvements in Animal-Feeding Devices, of which the following is a specification.

The present invention relates to improvements in animal feeding devices, of the animal controlled supply type, especially adapted for the use of hogs.

The primary object of the invention is to provide a feeding device for hogs which will be comparatively inexpensive in construction and operation, economical in the delivery of feed, and at the same time efficient in serving the food for the hogs.

The invention consists in novel combinations and arrangements of parts as will be hereinafter set forth and claimed.

In the accompanying drawings I have illustrated one complete example of the physical embodiment of my invention constructed according to the best mode I have so far devised for the practical application of the principles of my invention.

Figure 1 is a perspective view of the feeding device constructed according to my invention. Fig. 2 is a vertical sectional view of the feeding device. Fig. 3 is a horizontal sectional view of the device, the side lids being omitted to enable clearer illustration. Fig. 4 is a perspective view of one of the agitator plates. Fig. 5 is a similar view of another of the agitator plates. Fig. 6 is a view of a modified form of the feed box. Fig. 7 is a similar view showing the hinged doors and a removable lid.

Referring particularly to the drawings which illustrate the preferred form of my invention, the casing or box 1 is of rectangular shape formed with a pair of top doors or hinged lids 2 2, and detachable boards or doors 3 3 located at the sides of the box. By means of these doors or lids the interior of the box is accessible for cleansing, replenishing the food supply, or for repairing the box, etc. The boards 3 cover the open chambers 4, 4, the inclined walls 5 of which extend out at the sides of the box 1, and the boards are held in place by the cleats 7 resting on these walls as shown in Fig. 2.

At the lower edge of the sides of the box an opening 6 is provided which communicates with a trough as 8, one of which is located at the bottom of the box and extends from end to end of the box. Each of these troughs is covered by a fixed top 9 and each trough is equipped with a swinging hinged door 10. These doors 10 hang vertically and are adapted to swing inwardly. They are prevented from swinging outwardly by contact with the upturned edge of the box bottom 11. The doors 10 may be pushed inwardly by the animal in order to gain access to the interior of the trough, and they are closed by gravity to keep out the weather or undesirable animals or fowls.

Extending longitudinally of the box is an interior angular partition 12 projecting upwardly from the bottom 11 and this partition is capped by an angle plate 13.

For convenience I have illustrated the device as a whole as constructed of wood and the cap plate 13 as of metal. It will be understood of course that the parts may be made up from suitable material as desired, and I do not limit myself to the material shown in the drawings.

Above the partition are located a pair of inclined boards 14 14 which are detachable, but are supported at the ends of the box on metallic hangers 15, 15. It will be noted that the degree of inclination of these boards may be varied because of the formation of the supports 15 which are screwed to the end walls of the box. The boards rest at the upper ends against the side walls of the box, but the lower ends may be moved toward or away from the center of the box to decrease or increase the capacity of the hopper 16 which is formed by these two boards. Below the boards a distributing chamber 17 is formed at each side of the partition which chambers are accessible through the open extensions 4 before described.

It will be apparent that the feed is placed in the hopper 16 through the open tops or openings after the lids 2 are opened, and the feed is distributed and divided by the partition 12 so that it flows or falls into the two distributing chambers 17 whose respective bottoms are formed by the partition 12 and boards or walls 5. In order to permit passage of the feed from the distributing chambers 17 17 to the hoppers 8, 8, openings 18 are provided in the bottom boards or walls 5. There are four of these openings illustrated in the drawings, two at each side of the partition 12 and adjacent thereto. In order to prevent an unrestricted flow of feed through these openings and to adjust the size of the openings in order to control the feed of material therethrough, I employ a series of movable and adjustable plates 19, one for each opening 18 and two at each side of the partition. These are metallic plates and are equipped with handles 20 and are adapted to slide and be guided by the guide plates 21 21 secured to the boards 5 5. At their lower ends each adjustable plate is provided with an open end slot 22 which coincides with the opening 18 in the boards 5, and at their upper ends each plate is provided with a closed slot 23. These slots 23 are designed to accommodate the screw bolts 24 which are fixed in the boards 5 and project through the slots 23, and by means of the wing nuts 25 the plates may be clamped in adjusted position after they are set as desired. Each adjustable plate has an agitator plate as 26 pivoted thereto at 27 and it will be understood that the agitator plates may be oscillated or swung on their pivots 27 with relation to the adjustable plate. At the lower end of each agitator plate 26 a yoke 28 is attached by means of which the movement for oscillating the plate is transmitted. Each agitator plate has an actuating plate 29 which is pivoted as by bolt 30 near the apex of the angle partition 12. The four pivot points and the upper ends of the four actuating plates are covered by the cap plate 13 to prevent material or feed interfering with the movement of the plates. The agitator and actuating plates are connected in pairs through the yoke 28 on the former and the pin 31 on the latter, the pin being formed integral with and projecting from a tongue 32 which is fastened rigidly by means of the bolt 30 and rivet 33 to the actuating plate. The extreme end of the tongue is bent at right angles to its normal plane, as at 34 and this portion of the tongue stands in a vertical plane so that it may be pushed by the hog which will use the end of its nose for the purpose. The loose connection between the pin 31 and yoke 28 permits a vertical adjustment of the agitator plate within the limits of the slot 23 and yet maintains the operative connection at all times between the pin and yoke so that when the tongue 34 is pushed or swayed on its pivot 30 and swings the actuating plate 29 with it, the movement also swings the plate 26 on its pivot 27 through the connection between the pin and yoke.

In Fig. 2 the adjustable hopper boards 14 are set to accommodate slow running or flowing feed, being spaced apart at their greatest width, but when feeding shelled corn, etc., the boards are brought nearer together and located in the near notches of the brackets 15. After the hopper is filled, access may be had to the adjustable plates 19 by removing the lids 3, and these plates may be clamped in adjusted position by the wing nuts 25. For shelled corn or quick flowing grain the adjustable plates or slides 19 should be set so that two or three kernels of corn will pass through the slots 18—22 at each stroke of the lever-tongue 34. For mill or ground feed the slides should be adjusted to feed down through the slots about a handful or tablespoonful at each stroke of the lever tongue. Because of this adjustment only so much feed is placed before the animal as will be sufficient to satisfy it, and a clear and clean trough is left for the succeeding animal to eat from. In this manner the animals are caused to eat more slowly and a great saving in feed is accomplished, and because of the slow eating by the animal it secures a greater amount of nutrition from the food. In introducing the animals to the feeder, the hinged doors 10 are first opened and held back to give free access to the trough. Then feed is permitted to flow to the trough and the animal permitted to eat therefrom. After learning where the food is located, the animal will lift or open the door 10 and quickly learn to move the lever tongue to operate the feed.

In the modified form shown in Figs. 6 and 7, the compartments 8', 8', of the trough are closed by two doors 10', 10' which are held open by hooks 10ᵃ and swing on hinges 10ᵇ. Here the tongues 34 project through an opening 6' into the trough compartments and are in position for free access to hogs, when the hinged doors are opened as shown in Fig. 7, the inwardly swinging doors 10, 10 being especially for small pigs.

What I claim is:—

1. The combination in a feed box having an inclined bottom and an open extension of the box having a slotted bottom at an angle to the inclined bottom, a trough beneath the slotted bottom having an inwardly swinging door, a hopper portion above the inclined bottom and an adjustable board located at an angle to the inclined bottom to direct feed thereto, a door to the hopper and a door to the extension, and means for agitating the feed to pass through the slotted bottom to the trough.

2. The combination in a feed box having an angular partition at its bottom portion and an upper hopper portion having laterally adjustable side boards at an angle to the adjacent partition sides, extensions with bottom boards slotted and located at an angle to the walls of the partition to form distributing chambers, a trough below each distributing chamber and an inwardly opening door to each trough, a lid to the hopper and to each distributing chamber, an agitating device in each chamber and means in the troughs for actuating said devices.

3. The combination in a feed box with a distributing chamber having angular bottom boards one of which is slotted and a trough beneath, of an adjustable slotted slide plate and an agitator plate pivoted thereon and a pivoted actuating plate in the chamber loosely connected to the agitator plate, and means in the trough for agitating said device.

In testimony whereof I affix my signature.

OTIS HALE CLOUGH.